United States Patent [19]

Graetz

[11] 4,273,888

[45] Jun. 16, 1981

[54] MACROMONOMERS

[75] Inventor: Clive W. Graetz, Glen Waverly, Australia

[73] Assignee: Imperial Chemical Industries Limited, London, England

[21] Appl. No.: 101,265

[22] Filed: Dec. 7, 1979

[30] Foreign Application Priority Data

Dec. 7, 1978 [GB] United Kingdom ............... 47584/78

[51] Int. Cl.³ ....................... C08G 63/76; C08L 67/00
[52] U.S. Cl. ........................................ 525/31; 525/39; 525/438; 525/445; 526/93; 528/297
[58] Field of Search ................... 525/438, 445, 39, 31; 526/93; 528/297

[56] References Cited

U.S. PATENT DOCUMENTS

| | | | |
|---|---|---|---|
| 3,249,653 | 5/1966 | van Amerongen et al. | 528/297 X |
| 3,375,301 | 3/1968 | Case et al. | 525/445 X |
| 3,838,106 | 9/1974 | Shuki et al. | 528/297 |
| 3,933,939 | 1/1976 | Isozaki et al. | 528/297 X |
| 4,097,465 | 6/1978 | Berger | 525/445 X |
| 4,097,466 | 6/1978 | Berger | 525/445 X |
| 4,112,012 | 9/1978 | de Cleur et al. | 525/438 |

*Primary Examiner*—Lucille M. Phynes
*Attorney, Agent, or Firm*—Cushman, Darby & Cushman

[57] ABSTRACT

Macromonomers are obtained by successively reacting an oligomer or polymer containing at least one hydroxyl group with a cyclic carboxylic anhydride in an amount of at least one mole of the anhydride per hydroxyl group, and reacting the product with a compound containing a single epoxide group and a single polymerizable double bond, in such proportions as to esterify all carboxyl groups in that product. Graft copolymers which are useful as steric stabilizers for dispersions of polymer particles can be made by copolymerizing the macromonomers with other polymerizable monomers.

7 Claims, No Drawings

MACROMONOMERS

This invention relates to macromonomers, that is to say to oligomeric or polymeric molecules which contain one or more polymerisable double bonds by virtue of which they are capable of copolymerising with other, low molecular weight monomers to form polymers of greater complexity.

A number of procedures have previously been described for preparing macromonomers, but these suffer from the disadvantage that various by-products are also formed which can interfere with the subsequent copolymerisation of the macromonomer with other monomers and which therefore have to be removed beforehand. For example, an oligomer or polymer having a reactive hydroxyl group may be subjected to ester interchange with an acrylic or methacrylic ester of a lower alcohol, such as methyl methacrylate, but it is generally necessary to use a large excess of the ester most or all of which may have to be separated later together with the lower alcohol released as by-product. Alternatively, a hydroxylic oligomer or polymer may be reacted with an acid chloride derived from a polymerisable acid, such as acrylic acid or methacrylic acid, but the reaction requires the presence of a base in order to neutralise the hydrogen chloride by-product and there is then a problem of separating the base hydrochloride from the macromonomer formed. Yet again, the hydroxylic oligomer or polymer may be esterified with a polymerisable acid itself, or with its anhydride, but here also there may be a problem of removing excess reagent and in addition it will be necessary to remove the catalyst, such as sulphuric acid or methanesulphonic acid, which is conventionally used in such a reaction.

A procedure has now been found whereby a hydroxyl group-containing oligomer or polymer can be easily converted into a derivative having one or more polymerisable double bonds by reactions which do not require the use of catalysts, and/or do not lead to the formation of any by-products, which could interfere with the subsequent copolymerisation of the derivative with another monomer.

According to the present invention, there is provided a macromonomer which is obtained by (i) reacting an oligomer or polymer containing at least one hydroxyl group with a cyclic carboxylic anhydride in an amount of at least one mole of the anhydride per hydroxyl group present in the oligomer or polymer, and (ii) reacting the product so obtained with a compound containing in the molecule a single epoxide group and a single polymerisable double bond in such proportions that all carboxyl groups in the said product are thereby esterified. Suitable oligomers or polymers containing at least one hydroxyl group may be of various types. They may, for example, be derived from unsaturated monomers, such as one or more acrylic or vinyl monomers; terminal hydroxyl groups may be introduced into the oligomer or polymer by polymerising the monomer(s) from which it is derived in the presence of a hydroxyl group-containing initiator and of a hydroxyl group-containing chain transfer agent, according to the method described in British Patent Specification No. 1,096,912. Suitable monomers for use in this method include the esters, amides and nitriles of acrylic acid and methacrylic acid, styrene and alkyl styrenes, vinyl esters of organic and inorganic acids such as vinyl acetate and vinyl chloride, and vinyl heterocyclic compounds such as 2-vinylpyrrolidone. Alternatively the oligomers or polymers may be of the type derived from cyclic monomers, such as those obtained by the polymerisation of alkylene oxides using a hydroxylic initiator such as water or a lower alcohol. Thus suitable oligomers or polymers of this type are the polyethylene glycols, the polypropylene glycols and the poly-(ethylene oxide)-poly(propylene oxide) block copolymers all of which contain two terminal hydroxyl groups in the molecule, or the corresponding monoalkyl ethers which contain a single terminal hydroxyl group. Yet other suitable oligomers and polymers include hydroxyl group-containing polyesters and hydroxyl group-containing polymers derived from epoxy resins. The location of the hydroxyl group or groups in the oligomer or polymer molecule is not critical, the important point being simply that it should be sufficiently reactive with the cyclic carboxylic anhydride; however, with steric considerations in mind, it is preferred that the hydroxyl group or groups should be terminal with regard to the oligomer or polymer chain. Similarly, the molecular weight of the oligomer or polymer is not critical to the performance of the invention, except for the possibility that as higher molecular weights are approached the reactivity of the hydroxyl group may fall to an inconveniently low level.

Suitable cyclic carboxylic anhydrides include both aliphatic and aromatic types, for example succinic anhydride, glutaric anhydride, 3:3—dimethylglutaric anhydride, adipic anhydride, maleic anhydride, itaconic anhydride and phthalic anhydride.

Suitable compounds containing in the molecule a single epoxide group and a single polymerisable double bond include glycidyl acrylate, glycidyl methacrylate, allyl glycidyl ether and methallyl glycidyl ether.

Step (i) of the process whereby the macromonomers of the invention are obtained may be carried out in the presence of a suitable inert solvent, for example a hydrocarbon such as toluene, by heating the reactants to a temperature sufficient to bring about the desired reaction, resulting in the production of the half-ester of the carboxylic acid with the hydroxylic oligomer or polymer. A suitable temperature will normally be in the range 120° to 150° C. The progress of the reaction may be followed by infra-red analysis or by measurement of acid value of the reaction mixture. In the event that the reaction proceeds sluggishly in the later stages, the solvent may be stripped off so as to allow a higher operating temperature.

In order to ensure that, in step (i), all the hydroxyl groups in the oligomer or polymer are converted to half-ester with the carboxylic anhydride, a stoichiometric excess of the anhydride may if desired be used. After completion of step (i), unreacted anhydride may then be converted to half-ester prior to the carrying out of step (ii) by reacting it with a lower alcohol, such as n-butanol or dimethylaminoethanol.

Step (ii) of the process is also carried out at an elevated temperature, for example at from 120° to 150° C., and here again the progress of the reaction may be followed by acid value measurement; preferably the reaction is continued until the acid value is substantially zero. The proportion of epoxy compound taken may be stoichiometric with respect to the free carboxyl groups present in the half-ester resulting from step (i) (including any half-ester derived from excess carboxylic anhydride, as described in the preceding paragraph), but, in the interests of facilitating the reaction, it will usually be desirable to employ a stoichiometric excess of the epoxy compound.

Where the oligomer or polymer contains only a single terminal hydroxyl group, as in the case of the monoethyl ether of a polyethylene glycol, the macromonomer finally obtained will contain a single terminal polymerisable double bond. If a polyethylene glycol itself is employed, then the macromonomer may correspondingly contain two terminal polymerisable double bonds; however it is possible in this case to employ less than the amounts of the carboxylic anhydride and of the epoxy compound which are theoretically required to achieve this, in which event the final product will be a statistical mixture consisting of a species containing two double bonds, a species containing one double bond and one of the original hydroxyl groups of the oligomer or polymer, and unreacted oligomer or polymer, respectively.

The macromonomers of the invention are readily copolymerisable with other monomers containing polymerisable double bonds to form graft copolymers. Thus, for example, the macromonomer derived from the monomethyl ether of polyethylene glycol molecular weight 2000, reacted with succinic anhydride followed by reaction with glycidyl methacrylate, may be copolymerised in a weight ratio of 1:1 with methyl methacrylate, or with a mixture of methyl methacrylate and butyl acrylate, to give a graft copolymer consisting of an acrylic polymer backbone carrying a plurality of pendant chains derived from the polyethylene glycol. The copolymerisation may be carried out under the conditions well known in the art for the polymerisation of acrylic monomers, that is to say by heating the monomers at a suitably elevated temperature, preferably in the presence of a catalyst or initiator such as an organic azo or peroxy compound, and if desired in solution in a suitable inert liquid which is a solvent both for the macromonomer and the co-monomer(s), and for the copolymer which is produced.

Selected copolymers made in this way, as in the illustration given above, can be arranged to consist of two major molecular components of sharply differing polarity. Thus, where the chain of the oligomer or polymer from which the macromonomer is derived is of a relatively polar nature, the macromonomer may be copolymerised with one or more monomers which give rise to a polymer chain of relatively low polarity. Conversely, a macromonomer containing a nonpolar chain may be copolymerised with monomers of a nature such as to yield a second chain which is relatively highly polar. Such amphipathic graft copolymers are very useful as steric stabilisers in the production of dispersions of particles, especially polymer particles, in liquids in which the particles are insoluble. For this purpose, the stabilising copolymer requires to contain in the molecule one component which is solvatable by the liquid of the dispersion and which therefore in practice is of a similar degree of polarity to that liquid; this component forms a steric barrier of solvated chains surrounding each particle. The copolymer at the same time requires to contain a second molecular component which is not solvatable by the dispersion liquid, and hence is of a different polarity to that liquid and also to the first component of the copolymer; this non-solvated component becomes associated with the particles, thus serving to anchor the steric barrier to their surfaces. By means of this barrier the particles are enabled to resist the attraction forces which normally tend to cause them to flocculate or aggregate.

For the production of amphipathic graft copolymers to be used as steric stabilisers in non-aqueous media of low polarity such as aliphatic hydrocarbons, macromonomers according to the invention which are derived from non-polar oligomers or polymers are useful, for example an oligomer or polymer of a long-chain alkyl ester of acrylic or methacrylic acid, such as lauryl methacrylate. Such a macromonomer is copolymerised with rather more polar monomers such as methyl methacrylate, and the resulting copolymer can be used to stabilise particles of polymethyl methacrylate in an aliphatic hydrocarbon.

Conversely, in order to produce an amphipathic graft copolymer suitable as a steric stabiliser in an aqueous medium, a macromonomer according to the invention will be used which is derived from a polar, hydrophilic oligomer or polymer. Particularly useful such oligomers or polymers are the polyethylene glycols, the polypropylene glycols and the poly(ethylene oxide)-poly(propylene oxide) block copolymers, and their monoalkyl ethers, of molecular weight from 200 to 5000, and the hydroxyl group-terminated polyvinyl pyrrolidones obtained by the method referred to above. Macromonomers derived from these oligomers or polymers are copolymerised with monomers of relatively lower polarity, for example with acrylic or methacrylic acid esters. The resulting copolymers can be used as steric stabilisers for dispersions in aqueous media of particles of polymer derived from the same or similar acrylic or methacrylic esters.

Where, in any of the sterically stabilised polymer dispersions mentioned above, it is acceptable or desired that the non-solvated or "anchor" component of the stabiliser should be identical in chemical composition to the polymer of the disperse phase, and where the disperse polymer is produced by polymerisation of monomer actually in the liquid which is to form the continuous phase, an appropriate macromonomer according to the present invention may be introduced into the reaction mixture before polymerisation is begun. When polymerisation proceeds, a minor part of the monomer or monomers copolymerises with the macromonomer to form the required amphipathic copolymer in situ; this effects stabilisation of the polymer particles as they are formed from the major part of the monomer.

The invention is illustrated by the following Examples, in which percentages are by weight.

EXAMPLE 1

To a 6-liter flask fitted with stirrer, thermometer, Dean and Stark separator, reflux condenser and provision for introduction of inert gas there was charged 3000 g (1.5 moles) of the monoethyl ether of polyethylene glycol (mol.wt. 2000) and 600 g of toluene. The charge was heated to reflux temperature (about 140° C.) and any water present was removed by azeotropic distillation via the Dean and Stark separator. The charge was then cooled to about 80° C. and 150 g (1.5 moles) of succinic anhydride was added. Reaction was effected at reflux temperature until measurement of acid value of the mixture showed that all the succinic anhydride had been converted to the half-ester. After cooling the mixture to 90° C., 3 g of hydroquinone, 320 g (2.25 moles) of glycidyl methacrylate and 4.6 g of dimethyl coconut amine were added in that order, the mixture heated to 130°–150° C. and held at that temperature until the acid value had fallen substantially to zero indicating complete reaction of the half-ester with the glycidyl methacrylate.

The product was a 85% solids solution in toluene of macromonomer containing a chain derived from the polyethylene glycol and a single polymerisable unsaturated grouping.

EXAMPLE 2

To a 2-liter flask fitted as described in Example 1 was charged 1000 g (0.5 mole) of the monoethyl ether of polyethylene glycol (mol.wt. 2000) and 100 g of toluene. Following the procedure of Example 1 there was added, after azeotropic removal of water, 100 g (1.0 mole) of succinic anhydride and the temperature of the reaction mixture was maintained at about 140° C. until the acid value was 76 mg KOH/g. On cooling to 100° C., there was then added 45 g (0.5 mole) of N,N-dimethylaminoethanol and the temperature was held at 140° C. until the acid value was 49 mg KOH/g. The batch was cooled to 70° C. and 1 g of hydroquinone was added followed by 160 g (1.1 moles) of glycidyl methacrylate. The mixture was heated carefully up to 120° C., observing the onset of any exothermic reaction, and was then maintained at that temperature until the acid value was substantially zero.

The product was a 93% solids toluene solution of a macromonomer containing a chain derived from the polyethylene glycol and a single polymerisable unsaturated grouping, accompanied by the glycidyl methacrylate adduct of the half-ester of succinic acid with dimethylaminoethanol.

EXAMPLE 3

Using the apparatus and procedure described in Example 1, 750 g (1.0 mole) of the monoethyl ether of polyethylene glycol (mol.wt. 750), 50 g of toluene and 100 g (1.0 mole) of succinic anhydride were heated together to form the half-ester, following which there were added 2 g of hydroquinone, 200 g (1.4 moles) of glycidyl methacrylate and 2.5 g of dimethyl coconut amine.

The product was analogous to that obtained in the case of Example 1.

EXAMPLE 4

Using the apparatus and procedure described in Example 1, 4000 g (1.0 mole) of polyethylene glycol (mol. wt. 4000), 800 g of toluene and 160 g (1.6 moles) of succinic anhydride were reacted together, followed by 3 g of hydroquinone, 300 g (2.1 moles) of glycidyl methacrylate and 4.5 g of dimethyl coconut amine.

The product was a mixture of species; Poisson distribution calculations indicate that the composition of the mixture was approximately 4% unreacted polyethylene glycol, 32% of the derivative containing one of the original hydroxyl groups of the polyethylene glycol and one polymerisable double bond per molecule, and 64% of the derivative containing two polymerisable double bonds per molecule.

EXAMPLE 5

The procedure of Example 1 was repeated, using in place of the stated amount of glycidyl methacrylate an equivalent amount of glycidyl acrylate.

An analogous product to that of Example 1 was obtained.

EXAMPLE 6

The procedure of Example 1 was repeated, using in place of the stated amount of succinic anhydride an equivalent amount of phthalic anhydride.

An analogous product to that of Example 1 was obtained.

EXAMPLE 7

The procedure of Example 1 was repeated, using in place of the stated amount of succinic anhydride an equivalent amount of glutaric anhydride.

An analogous product to that of Example 1 was obtained.

What I claim is:

1. A macromonomer which is obtained by (i) reacting a polyethylene glycol or a monomethyl or monoethyl ether thereof with a cyclic carboxyl anhydride in an amount of at least one mole of the anhydride per hydroxyl group present in the said glycol or ether, and (ii) reacting the product so obtained with a compound containing in the molecule a single epoxide group and a single polymerisable double bond in such proportions that all carboxyl groups in the said product are thereby esterified.

2. A macromonomer as claimed in claim 1 wherein the cyclic carboxylic anhydride is selected from succinic anhydride, glutaric anhydride and phthalic anhydride.

3. A macromonomer as claimed in claim 1 or 2 wherein the compound containing a single epoxide group and a single polymerisable double bond is selected from glycidyl acrylate and glycidyl methacrylate.

4. A macromonomer as claimed in claim 1, wherein after completion of step (i) of the reaction sequence, unreacted anhydride is converted to half-ester by reacting it with a lower alcohol.

5. A macromonomer as claimed in claim 1, wherein step (ii) of the reaction sequence is continued until the acid value of the product is substantially zero.

6. A graft copolymer obtained by copolymerising a macromonomer as claimed in claim 1, with other monomers containing a single polymerisable double bond.

7. A graft copolymer as claimed in claim 8, wherein the two major molecular components of the copolymer are of sharply differing polarity.

* * * * *

UNITED STATES PATENT AND TRADEMARK OFFICE
CERTIFICATE OF CORRECTION

PATENT NO. : 4,273,888
DATED : June 16, 1981
INVENTOR(S) : Clive W. Graetz

It is certified that error appears in the above—identified patent and that said Letters Patent is hereby corrected as shown below:

On the title page, in the left hand column, under item [73] insert -- and Dulux Australia Limited, Melbourne, Australia -- after "England"

Signed and Sealed this

Seventeenth Day of November 1981

[SEAL]

Attest:

GERALD J. MOSSINGHOFF

Attesting Officer

Commissioner of Patents and Trademarks